(12) United States Patent
Krachman

(10) Patent No.: US 7,366,714 B2
(45) Date of Patent: *Apr. 29, 2008

(54) METHOD AND SYSTEM FOR PROVIDING ELECTRONIC DISCOVERY ON COMPUTER DATABASES AND ARCHIVES USING STATEMENT ANALYSIS TO DETECT FALSE STATEMENTS AND RECOVER RELEVANT DATA

(76) Inventor: Albert Krachman, 412 E. Columbia St., Falls Church, VA (US) 22046

( * ) Notice: Subject to any disclaimer, the term of this patent is extended or adjusted under 35 U.S.C. 154(b) by 318 days.

This patent is subject to a terminal disclaimer.

(21) Appl. No.: 11/005,213

(22) Filed: Dec. 6, 2004

(65) Prior Publication Data

US 2005/0086226 A1  Apr. 21, 2005

Related U.S. Application Data

(63) Continuation-in-part of application No. 10/830,722, filed on Apr. 23, 2004, now abandoned, which is a continuation of application No. 09/634,791, filed on Aug. 9, 2000, now Pat. No. 6,738,760.

(60) Provisional application No. 60/192,614, filed on Mar. 23, 2000.

(51) Int. Cl.
G06F 17/30 (2006.01)
(52) U.S. Cl. .................. 707/3; 707/1; 704/235
(58) Field of Classification Search .................. 707/3, 707/1
See application file for complete search history.

(56) References Cited

U.S. PATENT DOCUMENTS 3,548,385 A  12/1970  C.J. Tunis (Continued)

FOREIGN PATENT DOCUMENTS

WO  WO 97/12334  4/1997

(Continued)

OTHER PUBLICATIONS

Rose et al. "Legal Information Retrieval: A Hibryd Approach". May 1989. ACM, pp.*

(Continued)

*Primary Examiner*—Sana Al-Hashemi
*Assistant Examiner*—Hares Jami
(74) *Attorney, Agent, or Firm*—Roberts Mardula & Wertheim, LLC

(57) ABSTRACT

Electronic discovery on computer systems and archives is provided by using statement analysis of to identify false statements so as to retrieve relevant impeachment data and other evidence related to recorded statements. The recorded statement is analyzed for possible false statements and corresponding transcript data of the false statement, any precipitating question, and any follow-up questions are selected for use in the query. The selected text can be further processed before being used in the query. The query can be used in a search engine or used to train smart search agents. The search engine query or smart search agents are released onto target computer systems and/or archives to search for responsive data and documents. Notification, reports, and indexing of responsive data and documents can be provided to produce relevant results. The analysis of the recorded statement is preferably done by voice stress analysis.

43 Claims, 10 Drawing Sheets

U.S. PATENT DOCUMENTS

| | | | |
|---|---|---|---|
| 5,159,180 A | | 10/1992 | Feiler |
| 5,444,615 A | | 8/1995 | Bennett et al. |
| 5,576,954 A | * | 11/1996 | Driscoll .................. 707/3 |
| 5,758,027 A | | 5/1998 | Meyers et al. |
| 5,819,248 A | | 10/1998 | Kegan |
| 5,875,431 A | | 2/1999 | Heckman et al. |
| 5,940,800 A | * | 8/1999 | Bennett et al. ............ 705/1 |
| 6,006,213 A | | 12/1999 | Yoshida |
| 6,028,601 A | * | 2/2000 | Machiraju et al. ........ 715/705 |
| 6,128,608 A | | 10/2000 | Barnhill |
| 6,236,942 B1 | | 5/2001 | Bush |
| 6,289,342 B1 | * | 9/2001 | Lawrence et al. ............ 707/7 |
| 6,324,532 B1 | | 11/2001 | Spence et al. |
| 6,366,925 B1 | * | 4/2002 | Meltzer et al. ............ 705/6 |
| 6,523,008 B1 | * | 2/2003 | Avrunin et al. ............ 704/273 |
| 6,658,398 B1 | | 12/2003 | Bertrand et al. |
| 6,678,669 B2 | | 1/2004 | Lapointe et al. |
| 6,789,069 B1 | | 9/2004 | Barnhill et al. |
| 6,882,990 B1 | | 4/2005 | Barnhill et al. |
| 2001/0034739 A1 | | 10/2001 | Anecki et al. |
| 2003/0204311 A1 | | 10/2003 | Bush |

FOREIGN PATENT DOCUMENTS

| | | | |
|---|---|---|---|
| WO | WO 9712334 A1 | * | 4/1997 |

OTHER PUBLICATIONS

Electronic Evidence Discovery. Leading the World in Electronic Discovery. 1998—http://eedinc.com.

Electronic Discovery. 2000.—Ontrack, http://ontrackevidence.com/electronic discovery.

Autonomy Technology White Paper. 2000.—Autonomy, Inc., www.autonomy.com.

Rose et al. Legal Information Retrieval: A Hybrid Approach. May, 1989.—ACM, pp. 138-146.

Schweighofer et al. A Learning Technique for Legal Documents Analysis. 1999.—ACM, pp. 156-163.

* cited by examiner

Figure 6

METHOD AND SYSTEM FOR PROVIDING ELECTRONIC DISCOVERY ON COMPUTER DATABASES AND ARCHIVES USING STATEMENT ANALYSIS TO DETECT FALSE STATEMENTS AND RECOVER RELEVANT DATA

RELATED APPLICATIONS

This application is a Continuation-in-Part of U.S. application Ser. No. 10/830,722 filed Apr. 23, 2004, now abandoned which is a Continuation of U.S. application Ser. No. 09/634,791 filed Aug. 9, 2000, now U.S. Pat. No. 6,738,760, which claims the benefit of U.S. Provisional Application No. 60/192,614, filed Mar. 23, 2000, all of which are herein incorporated by reference for all purposes.

FIELD OF THE INVENTION

The present invention is drawn to a method and system for providing electronic discovery on computer databases and archives using statement analysis to detect false statements and provide query input for a search engine or training input for an Artificial Intelligence (AI) search engine. More particularly, a preferred embodiment of the present invention uses voice stress analysis to determine when a subject is potentially making a false statement and then uses the false statement and/or part of the precipitating question as a query to search computer databases and archives for data most relevant to the subject matter of the potential false statement. The invention can employ various search engines and is useful for many purposes, including but not limited to litigation, regulatory proceedings, regulatory compliance, investor analysis, legislative proceedings, mergers & acquisitions, background checks, homeland security, and criminal law enforcement.

BACKGROUND INFORMATION

As discussed in the parent application, now U.S. Pat. No. 6,738,760, businesses and institutions today maintain massive volumes of electronic and paper data. These entities are often called on to sift through and discover relevant data, a process that is extremely time-consuming, labor-intensive, and expensive.

For example, discovery requests during litigation can cause various problems for the parties with respect to hard copies, computer databases, and archives. For the party making discovery requests, the primary problems are (i) the enormous amount of data to be sifted through resulting from broad discovery requests and (ii) the failure to discover broadly distributed information resulting from narrow discovery requests. For parties responding to discovery requests, the primary problems are (i) the enormous amounts of data which must be kept and/or turned over as a result of the litigation and (ii) the unintended production of new discoverable material.

Problems can also arise before a complaint is filed. As soon as one-party knows there is a potential dispute, that party will want to search its own records and interview its employees to assess risk and find evidence of problematic documents. The party will also want to send a document preservation letter to the other side early in the process.

Once a complaint is filed, the litigant is under a duty to preserve what it knows, or reasonably should know, is relevant in the action, is reasonably calculated to lead to the discovery of admissible evidence, is reasonably likely to be requested during discovery, and/or is the subject of a pending request.

On the response side, is now fairly clear that automatic electronic document destruction cannot continue after the responding company receives discovery requests, subpoenas or other similar legal process. On the other hand, the company does not want full-scale disruption of its data retention policy.

Beyond the management of old archival documents, a substantial problem exists in the area of newly created data. Once litigation is filed, does every e-mail created after the lawsuit become fair game? The famous Microsoft anti-trust case seems to indicate that the answer is "yes." There is currently no software system that helps a company manage the creation of new, responsive and potentially embarrassing data.

Likewise, similar situations occur with respect to creation, maintenance, and recovery of information relevant to other activity, such as, but not limited to, legal issues like regulatory compliance (e.g., EEO, EPA, FTC, etc.), mergers & acquisitions (liabilities, indemnification, etc.), due diligence inquiries, Freedom of Information Act (FOIA) requests, the legislative and political processes, homeland security and criminal law enforcement.

However, some litigation and enforcement problems not directly addressed by U.S. Pat. No. 6,738,760 include the issue of identifying relevant data for impeaching witnesses deponents or other speakers, or leading the user to other data closely related to the false statements, as well as the issue of determining when it is highly likely that a witness or deponent is making a false statement subject to impeachment. Indeed, when the speaker makes a false statement, it is essential to identify the documents that relate to the false statement, both for impeachment purposes and for further probing of other lines of inquiry. The prior art lacks any means for identifying training material for the AI technology of U.S. Pat. No. 6,738,760 to address potentially false statements for any other reason, such as for regulatory compliance, background checks or law enforcement.

A known means for determining when it is highly likely that a subject is making a false statement is a voice stress analyzer. The voice stress analyzer first came into being in the law enforcement arena during the early 1970's through research and development by private individuals and the U.S. Army. Originally developed in the form of the Psychological Stress Evaluator (PSE), its purpose was to graphically display stress in the voice of a speaker when asked relevant questions.

Human speech is generated by the vocal cords and by turbulence as expelled air moves through the vocal tract creating a resonance of the cavities in the head, the throat, the lungs, the mouth, the nose, and the sinus cavities. Previous experiments show three types of voice-change as a result of stress. The first of these usually manifests itself in audible perceptible changes in speaking rate, volume, voice tremor, spacing between syllables, and fundamental pitch or frequency of the voice. The second type of voice change is not discernible to the human ear, but is an apparently unconscious manifestation of the slight tensing of the vocal cords under even minor stress, resulting in a dampening of selected frequency variations. When graphically portrayed, the difference is readily discernible between unstressed or normal vocalization and vocalization under mild stress, attempts to deceive, or adverse attitudes. These patterns have held true over a wide range of human voices of both sexes, at various ages, and under various situational conditions. The third is an infrasonic, or subsonic, frequency modulation which is present, in some degree, in both the vocal cord sounds and in the formant sounds. This signal is typically between 8 and 12 Hz. Accordingly, it is not audible to the human ear. Due to the fact that this characteristic constitutes frequency modulation, as distinguished from amplitude modulation, it is not directly discernible on time-base/amplitude chart recordings. However, this infrasonic signal, sometimes referred to as "micro-tremors," is one of the more significant voice indicators of psychological stress and it is theorized that this stress can be indicative of a false statement.

Software tools for this type of voice stress analysis are available for use with personal computers. One such tool is the open source "LiarLiar" tool available under the GNU public license from http://liarliar.sourceforge.net/

There are currently many other voice stress analyzers (VSA) on the market today. The major VSA vendors market their products on a laptop with specific software, while few are sold as an electronic device with the software embedded on its chips. Some examples are:

- Psychological Stress Evaluator (PSE), Dektor Counterintelligence and Security, Inc.
- Lantern, The Diogenes Group, Inc.
- Vericator, Trustech Ltd. Integritek Systems Inc.
- Computerized Voice Stress Analyzer (CVSA™), National Institute for Truth Verification (NITV)
- VSA Mark 1000, CCS International Inc.
- VSA-15, CCS International Inc.
- Xandi Electronics (markets a kit)

Other known means to analyze statements for truth or falsity include the use of standard polygraph "lie detection" techniques and the use of humans skilled in the art of detecting lies, such as "Truth Wizards" identified through screening by researchers at the University of California at San Francisco.

BRIEF SUMMARY OF THE INVENTION

The present invention is a system and method for searching and managing data relevant to potentially false statements using search engine technology applied to computer databases and archives or any form of electronic data storage. The invention applies to any situation where persons speak on a given subject, where there is computer-accessible data containing information relevant to the speakers topics, and someone is concerned about the truth or falsity of the speaker's statement and wants to check related documents. The invention further allows manual selection of portions of voice transcripts that do not register as false statements for purposes of identifying documents related to any other (i.e., non-false) statements. Although primarily described as it relates to computer databases and archives, the present system can also be used on hardcopy documents by scanning them into electronic form, preferably using optical character recognition (OCR) software to produce a better-searchable file. Likewise, although primarily described with respect to voice stress analysis for the detection of potentially false statements, any other detection method, such as polygraph lie detectors and "Truth Wizards" can also be used.

As used herein, the terms "discovery" and "impeach" relate not only to discovery and impeachment in litigation, but to searching for data relevant to false statements in general, such as, but not limited to, regulatory proceedings, regulatory compliance, background checks, legislative and rulemaking proceedings, homeland security applications, and criminal law enforcement. As such, the terms "witness" and "deponent" are likewise meant to be broader than the litigation use of these terms, and include any speaking person.

Additionally, the term "search engine" refers to any software capable of searching for data based upon some criteria. Known search engine technologies include, but are not limited to, index searching, pattern matching, and concept searching. The term "artificial intelligence" or "AI" refers to the simulation of human intelligence processes by computer systems. The AI processes include learning (the acquisition of information and rules for using the information), reasoning (using the rules to reach approximate or definite conclusions), and self-correction, as typically provided by a neural network that has been initially "trained" or fed large amounts of data and rules about data relationships. As used herein, AI search technology is a specific type of search engine that applies sophisticated algorithms and probabilities to search computer databases and archives for data most relevant to the subject matter of the potential false statement.

The term "recorded statements" refers to both to the statements of speakers that have been previously recorded onto a media, including but not limited to those recorded on audio tape, video tape, audio disc, video disc, flash memory, and hard drives, as well as "live" statements of speakers that are recorded or converted into electrical impulses by a microphone associated with a computer operating a software module of the present invention or networked thereto. Notwithstanding this, statements will sometimes be referred to in the specification as both "recorded" and "live" in order to clarify the usage of the invention being discussed.

The term "context information" refers to the text adjacent to the potentially false statement, typically including the text of the precipitating question and, in certain circumstances, any follow-up questions. The text of the context information can be further processed to eliminate common words ("a," "an," "the," "it," "is," "was," "were," "we," etc.) and include synonyms and antonyms.

Previously recorded media can include a synchronized transcript, which can be provided by various transcription vendors. For previously recorded media and "live" recordings for which a synchronized transcript is unavailable, voice recognition software can be used to produce a transcript and automatic time-stamping software can be used to synchronize the transcript to the recorded statement. Any suitable synchronization technology can be used, including the widely compatible Synchronized Multimedia Integration Language (SMIL) standard developed by the World Wide Web Consortium.

By using statement analysis to provide at least part of an input query for a search engine, a user can search for and extract data relevant to the statement's subject matter. The search engine software can be applied to various database targets or unstructured computer resident data, and analyzed off-site over the Internet.

Applying statement analysis and an AI search engine to discovery-related input parameters, a searcher can employ smart search agents or "bots" against data to search for and extract responsive data. The AI software can be applied directly into the database targets or analyzed off-site over the Internet. Likewise, a speaker (witness or deponent) or their representative can use the statement analysis and search engine technology to prepare for hearings, depositions, questioning.

It is one aspect of the invention to use voice analysis on live or recorded statements to create search agents for AI-based electronic discovery on computer systems, databases and archives using artificial intelligence to produce relevant search results from any data, either originally captured or translated into electronic form.

It is another aspect of the invention to use voice analysis on recorded statements to create input queries for electronic discovery on computer systems, databases and archives using search engines to produce relevant search results from any data, either originally captured or translated into electronic form.

It is an aspect of the invention to use voice stress or conventional lie detection results indicative of the speaker's making a potentially false statement to create a search agent query for use in an electronic search of any form of computer data, which then automatically executes an electronic search and discovery on computer databases and archives using the AI-trained search agents.

It is another aspect of the invention to automatically process context information based at least upon text proximate to the potentially false statement to form at least part of the query.

It is therefore another aspect of the invention to automatically identify relevant data on computer systems and databases, based on the identification of a probable false statement and use of processed context information as input for a search query.

It is an aspect of the invention to offer alternate types of search engines, including key word, fuzzy logic, concept matching which can be provided with input related to a potentially false statement in order to search for relevant impeachment documents.

It is another aspect of the invention to recognize terms and facts related to potentially false statements for inclusion in the query or as the query so that the most relevant impeachment documents and data are produced.

It is a further aspect of the invention to allow the system users to check any user-selected statements against the database to identify documents relevant to the statement.

It is an aspect of the present invention to provide electronic discovery for the purpose of impeachment in litigation, homeland security, alternative dispute resolution, background checks, regulatory compliance, legal risk management, and/or criminal law enforcement.

It is another aspect of the invention to operate a software program using the voice analysis and search engine software that would alert a questioner or other party that possibly false statements have been made to allow for some measure of real-time handling, such as further questioning or risk management.

BRIEF DESCRIPTION OF THE DRAWINGS

FIG. 6 illustrates a GUI screenshot of the results of an embodiment of the present invention.

DETAILED DESCRIPTION OF THE INVENTION

Figure 1:
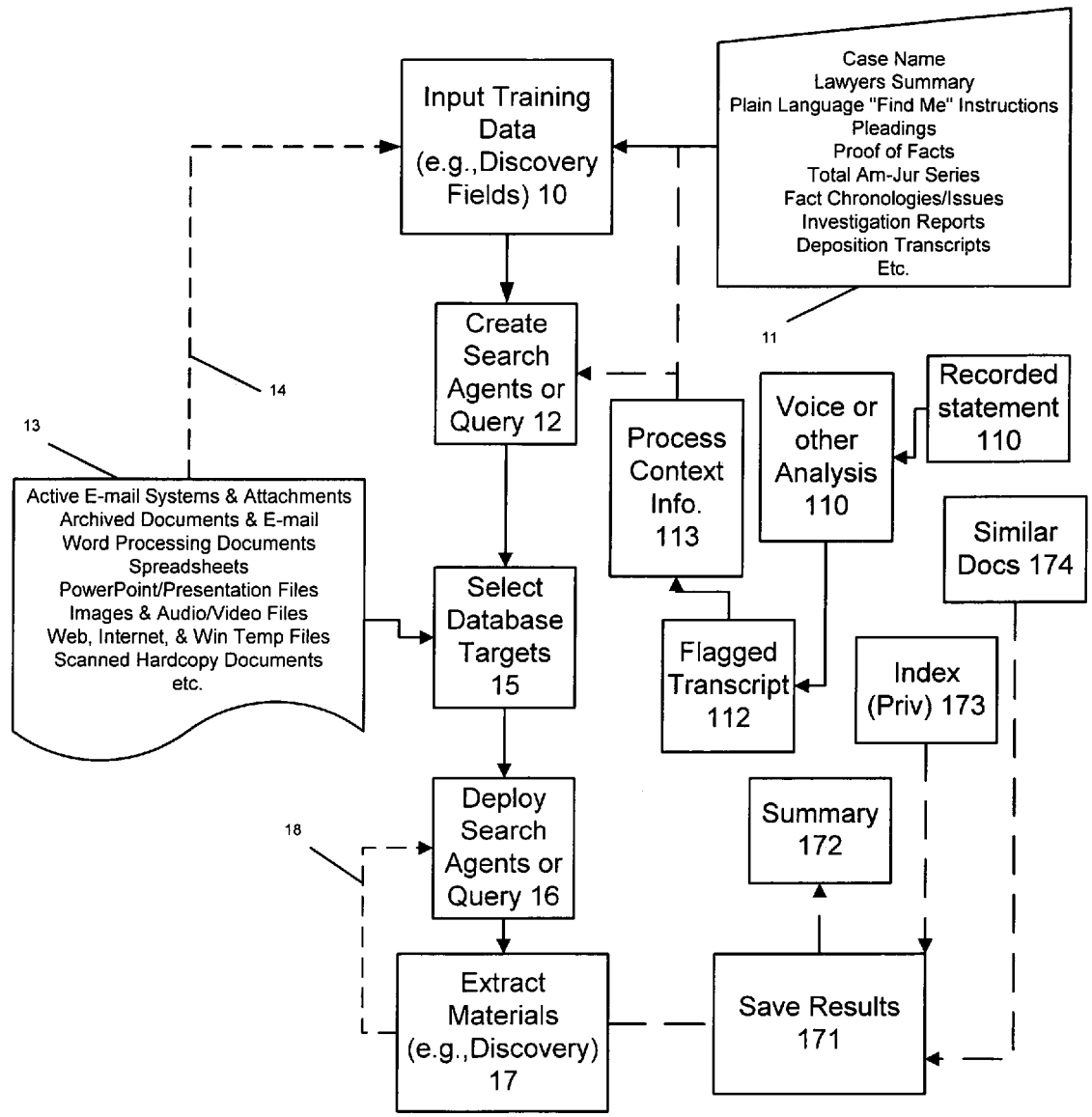
FIG. 1 illustrates a basic flow chart of one embodiment of the present invention.

Referring to FIG. 1, a basic flow diagram of one embodiment of the present invention is illustrated. Appropriate data or fields (sometimes referred to collectively as "data") 11 needed to create and train a neural network, such as the Dynamic Reasoning Engine (DRE) available from Autonomy, Inc. (301 Howard St., 22nd Floor, San Francisco, Calif. 94105) using AI are input 10. Alternate sources for AI search agent software are available from Hummingbird Ltd. of Toronto, Canada (Fulcrum KnowledgeServer) and Verity Inc. of Sunnyvale, Calif.

For example, in the case of litigation, 11 would typically include:

Case Name
Lawyers Summary
Plain Language "Find Me" Instructions
Voice Recognition Instructions
Pleadings (via Pleading Reader)
Target Data which is the Subject of Search
Proof of Facts
Total Am-Jur Series
Fact Chronologies/Issues
Investigation Reports
Deposition Transcripts It is also possible to use the system on the raw discovery data before or without training the neural net with the fielded information. For other search engine technologies, input 10 will involve the relevant input for operation of the search engine, including but not limited to document indexing, heuristic document clustering, and conceptual document clustering.

A software module for statement analysis 110 analyzes recorded or live statements 111 for possible false statements. A well-known method of accomplishing this task is voice stress analysis by the measurement and detection of "microtremors" in the form of the inaudible vibrations that speed up uncontrollably when a person is lying. Although this is the preferred method of voice analysis for use in the present invention, any other similar existing or future-developed technology can be used as part of the present invention. For example, as video testimony and video analysis technology improve, non-verbal cues (blinking, hand wringing, shrugs, etc.) can also be analyzed for the detection of possible false statements. Alternatively or in addition thereto, traditional lie detection methods could also be used to analyze the statement. Although this analysis will generally only be indicative of a potentially false statement, the term "false statement" will be used hereinafter for purposes of brevity.

When the voice or other analysis software module 110 detects a false statement from a recorded or live statement 111, the corresponding text transcript of that false statement is flagged 112. The text of the transcript proximate to the flagged false statement will typically consist of any question that may have precipitated the false statement, and/or any related follow-up questions. In a preferred embodiment, this is also flagged and becomes context information 113 related to the false statement. The flagged context information 113 and the flagged false statement 112 are then input to create a query or search agent 12 that will automatically query the subject databases 13 that have been selected as targets 15 when deployed 16 to search for relevant material 17 that can possibly be used for impeachment, and/or to identify documents most relevant to the false statement. It is also beneficial to allow a user to manually select any portion of a recorded statement transcript in order to find documents relevant to the statement. This expands the utility of the invention beyond false statements and further allows an easy method for employing "Truth Wizards" for lie detection.

The neural network or search engine can also be linked to on-line legal services such as Westlaw or Lexis in order to input the latest information related to a legal issue.

In many cases, it will also be desirable to input 14 the target databases as part of the input for training the search agents.

Another feature of the present invention is the ability to use selected pleadings, discovery responses and other data, including the target database, with standard or proprietary neural network/AI software to develop a search algorithm. In other words, an electronic query derived from to the possible false statement and context information 110 would be formulated by the software and then converted to smart search agents 12 or "bots" by training of the neural network.

Pleadings and other documents that may be desired to be included in any analysis are input to the system of the present invention using an intelligent reader. An intelligent reader can typically include a scanner and optical character recognition (OCR) software for paper documents, optical/magnetic media reader (for CD-ROM, DVD, floppy discs, etc.), a microphone and voice recognition software for voice input, and/or communication means operating with software/API/NI to accept input from online sources. Other input means, such as a keyboard, can be included for manual (i.e., "non-intelligent") input.

As previously mentioned, the database being searched can also be input 14 as part of the information used to create the search agents 12, as is presently done by the proprietary neural network/AI software available from Autonomy, Inc. and Concept Search, Inc., although this is not required and meant as a limitation of the present invention. When practiced with other search engines, the input query 12 will be deployed via the search engine at 16 to produce the relevant search results 17.

One step in the process is to select the targets for the search 15, although this step may have to be performed earlier in order to determine the proper training data if input 14 above is used. Typical computer system targets 13 would include:

Active E-mail Systems and attachments
Archived Documents and E-mail WP Documents, Spreadsheets, Powerpoint/presentation files, images, audio/video files (e.g., mpeg, wav)
Web, Internet and Windows temp files
Scanned hardcopy documents
Other files In an AI embodiment, the smart search agents 12 then run through the target 13 by being deployed 16 and extract responsive data 17. The search and extraction process can advantageously include iterative subset searching 18 in order to allow refinement of the search results from the material extracted 17. Preferably, the results are saved 171. Output can include various forms, including, but not limited to, options to produce summaries 172, indexes 173 (such as for a privilege index), and similar documents 174, in addition to the documents themselves.

Figure 2:
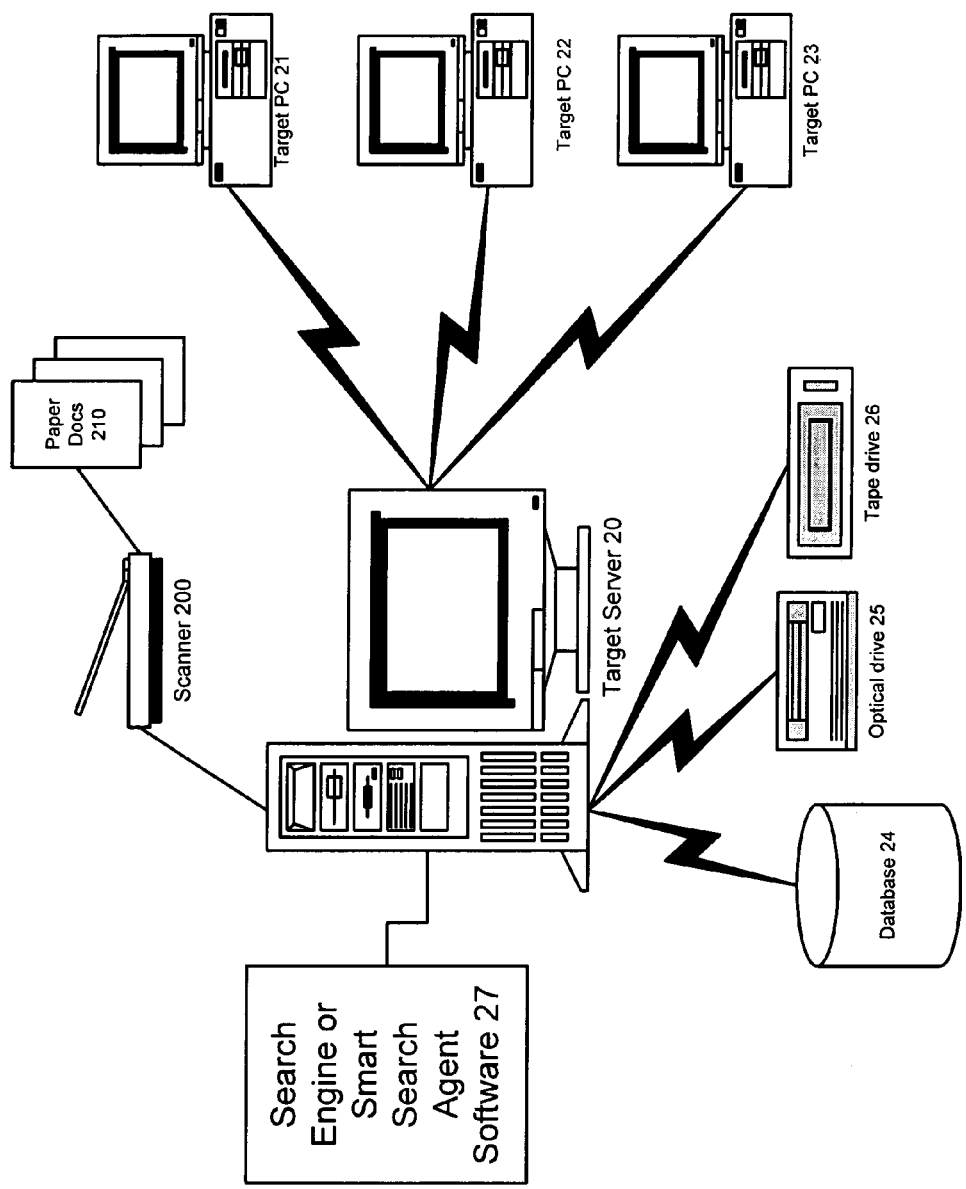
FIG. 2 illustrates a typical diagram of the query or smart search agent deployment of the present invention on a computer system.

As illustrated in FIG. 2, the search engine or smart search agent software 27 of the present invention can be deployed on the target computer system 20-26. When loaded on the target server 20, the target data is indexed into the search engine. The index process can capture data on any networked databases 24, on the hard drives or RAM of target PC's 21, 22, 23, and on the target's archive systems such as tape drives 26 and optical drives 25. After a search, when responsive data is found, it is extracted and forwarded to the appropriate parties. Restoration procedures of archived data will usually need to be performed to enable the searching of the present invention.

As illustrated in the figure, a scanner 200, or other equivalent device, can be used to convert hardcopy (paper) documents 210 into electronic form for searching, preferably using OCR technology. This aspect of the invention enables enormous savings in manpower over methods traditionally used in the legal field.

Figure 3:
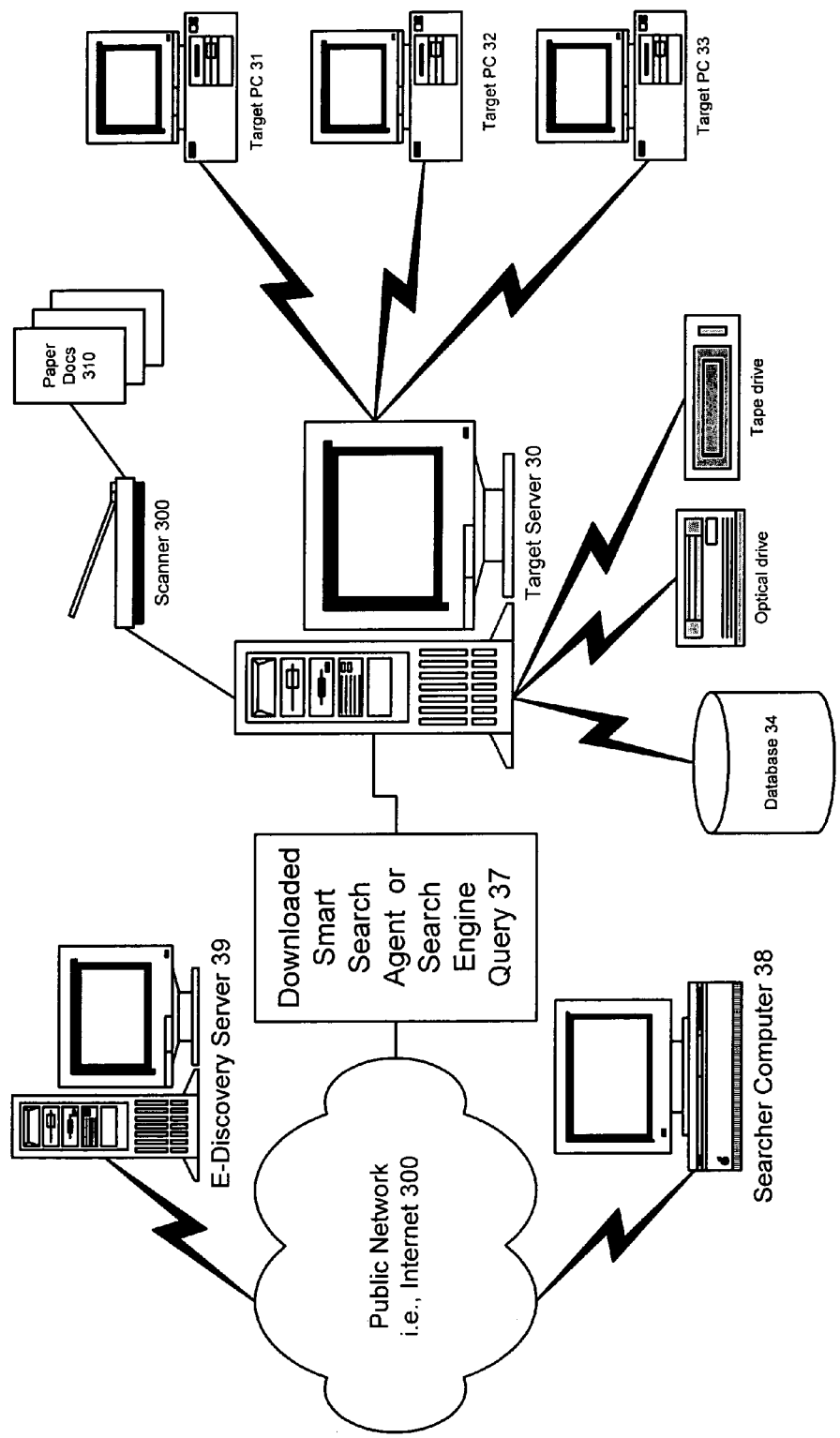
FIG. 3 illustrates a typical diagram of a network-based deployment of search engine or smart search agent software of the present invention on a computer system.

FIG. 3 illustrates a network-based system for employing one possible embodiment of the present invention, using like numerals corresponding to FIG. 2 for like components. In this system, the voice analysis module of a stress analysis or other detection device sends input information to an electronic discovery server 39 containing the search engine or AI software for producing smart search agents. In alternate embodiments, the search engine or AI software 37 itself can be loaded or downloaded onto any computers 30, 38 or accessed via the network 300 (i.e., via a Java applet accessed by a browser over the Internet). The services provided can also be delivered over the Internet, substantially in real-time. Transcribed proceedings, as well as those processed by voice recognition technology, could be analyzed over the web and reports furnished to the users in substantially real-time.

In one preferred embodiment, the present invention comprises software to develop and deploy the AI based search agents to provide the following functional elements or tools as disclosed in U.S. Pat. No. 6,738,760:

Interceptor
Litigator
Responder
Diligencer

The interceptor, responder and diligencer tools disclosed in U.S. Pat. No. 6,738,760 and incorporated herein by reference will not be discussed further herein.

The statement analysis software module is preferably integrated in the AI-Litigator tool, which is a document analysis system. The voice analysis software module provides an input query based upon the flagged portion of the recorded statement transcript (which can simultaneously be produced by voice recognition) to the litigator tool, which then uses an AI search agent that "learns and understands" the content, context, and objective of the requester, and then applies this understanding to the electronic search of the target's electronic files. This technology employs searches that are significantly more sophisticated than simple word searches and transcends traditional search methods, in effect allowing an "expert in a box" to search databases for concepts, with greater speed and accuracy than existing methods. Use of this technology in the present invention has significant advantages in document intensive electronic discovery work. For litigation purposes, the software can feature automated privileged indexes, and automated production of motions to compel and/or protective order motions.

An alternate version of the litigator tool can employ simpler search engine software, such as key word, fuzzy logic or similar code in place of the AI software. The addition of the voice analysis software module of the present invention provides an input query based upon the flagged portion of the recorded statement transcript (which can simultaneously be produced by voice recognition) to the litigator tool, which then supplies the input query to the search engine software to provide an electronic search of the target's electronic files.

Figure 4:
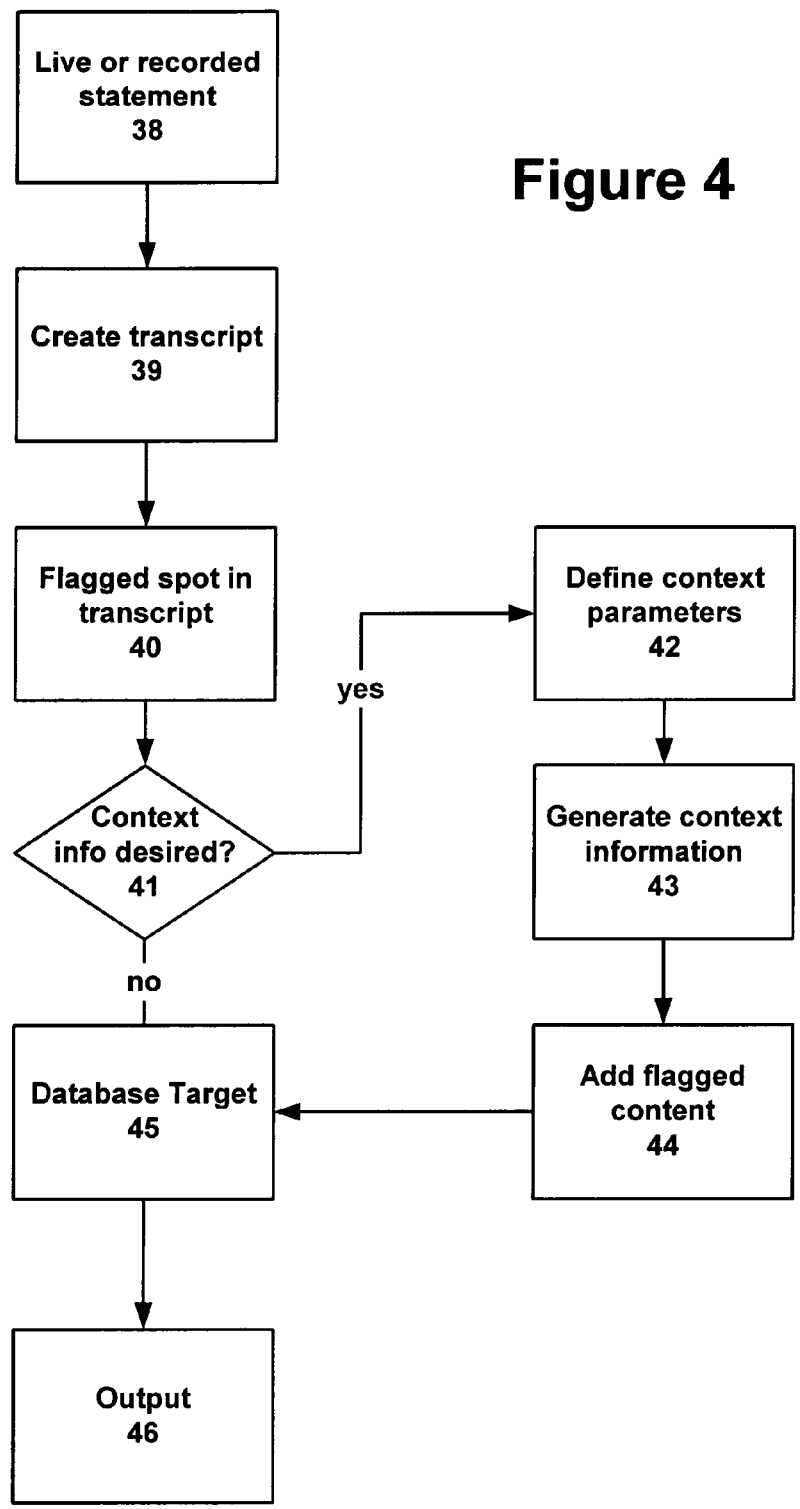
FIG. 4 illustrates a schematic diagram for the creation of output from a live or recorded statement in accordance with an embodiment of the present invention.

Referring now to FIG. 4, the creation of output from a live or recorded statement is illustrated. At the out set, a live or recorded statement is created 38. As noted earlier, this could be a recording of a witness and his/her statements, and/or a recording of a deposition or other oral testimony or statement that was made at another time, yet is to be analyzed. This process results in an audio file that can be analyzed by the voice stress analysis software discussed above.

A transcript (i.e. text) in electronic form is then created 39. This creation can be by a transcriber such as a court reporter, or may be produced through speech recognition software such as ScanSoft® Dragon NaturallySpeaking®, IBM ViaVoice®, or other similar programs. It may be stored in any of a wide variety of formats available for text processing known in the art.

The voice recording is analyzed for evidence of stress and the appropriate spot in the written transcript is flagged 40.

As noted earlier, context may be an important aspect of the analysis depending on the situation. Hence, the system allows an option for designating context information as part of the preparation of a query to the system of the present invention. The user is thus given the option of designating context information 41. If the operator does not desire context information to be part of the query generation process, the database target 45 is queried and output is provided 46.

If, however, context is desired to be a part of the query generation process, the user opts to include context information 41. The user can then define the context parameters to be included 42 in the retrieved test from the transcript. After designation of the desired context information, the system retrieves the context information 43 and adds the flagged content indicative of voice stress 44. The database target then receives a query 45 generated from the combined flagged portion of the transcript together with the context information. Output from the search is then generated 46.

Additionally, the statement analysis software module of the present invention can be used by counsel, law enforcement, or other questioners for real-time notifications of possible false statements, either during preparation or during recorded statements. In this case, the flagging of the potentially false statement can allow the counsel to address the matter prior to any impeachment scenario. It can also produce a search engine query or a smart search agent or "bot" to search for discoverable documents that might impeach the speaker, and/or lead to other evidence related to the false statement. This would work in substantially real-time and allow for some measure of risk management.

The following hypothetical is useful for illustrating the use of the present invention. The setting is a videotaped deposition, trial, or other setting where a witness is answering questions that are being transcribed and further include the audio being recorded. Voice recognition may also do the transcription. The matter would involve a large number of documents that have been indexed into an AI based discover system. Assume the witness is answering the questions below:

VIDEOTAPEDDEPOSITIONOFBILLSMITH

19 QUESTION: WHEN DID YOU BECOME THE HEALTH AND SAFETY OFFICER?
20 ANSWER: JANUARY 1996
21 QUESTION: WERE YOU PRESENT FOR ANY SAFETY AUDITS?
22 ANSWER: YES, I SUPERVISED 3 AUDITS.
23 QUESTION: ISNT IT TRUE THAT THE COMPANY
24 HAS A LONG HISTORY OF HEALTH AND SAFETY PROBLEMS?
25<u>ANSWER:NO.THECOMPANYHASNEVERRECEI VEDAN</u>
26<u>OSHACITATIONANDHASBEENINFULLCOMPLIA NCEWITH</u>
27 <u>ALLOSHAREGULATIONSFORTHEPASTFIV EYEARS.</u>
28 QUESTION: WAS THE COMPANY INSPECTED BY ANY MARYLAND STATE HEALTH AND SAFETY OFFICES?
29 ANSWER: I DON'T RECALL.

Figure 5:
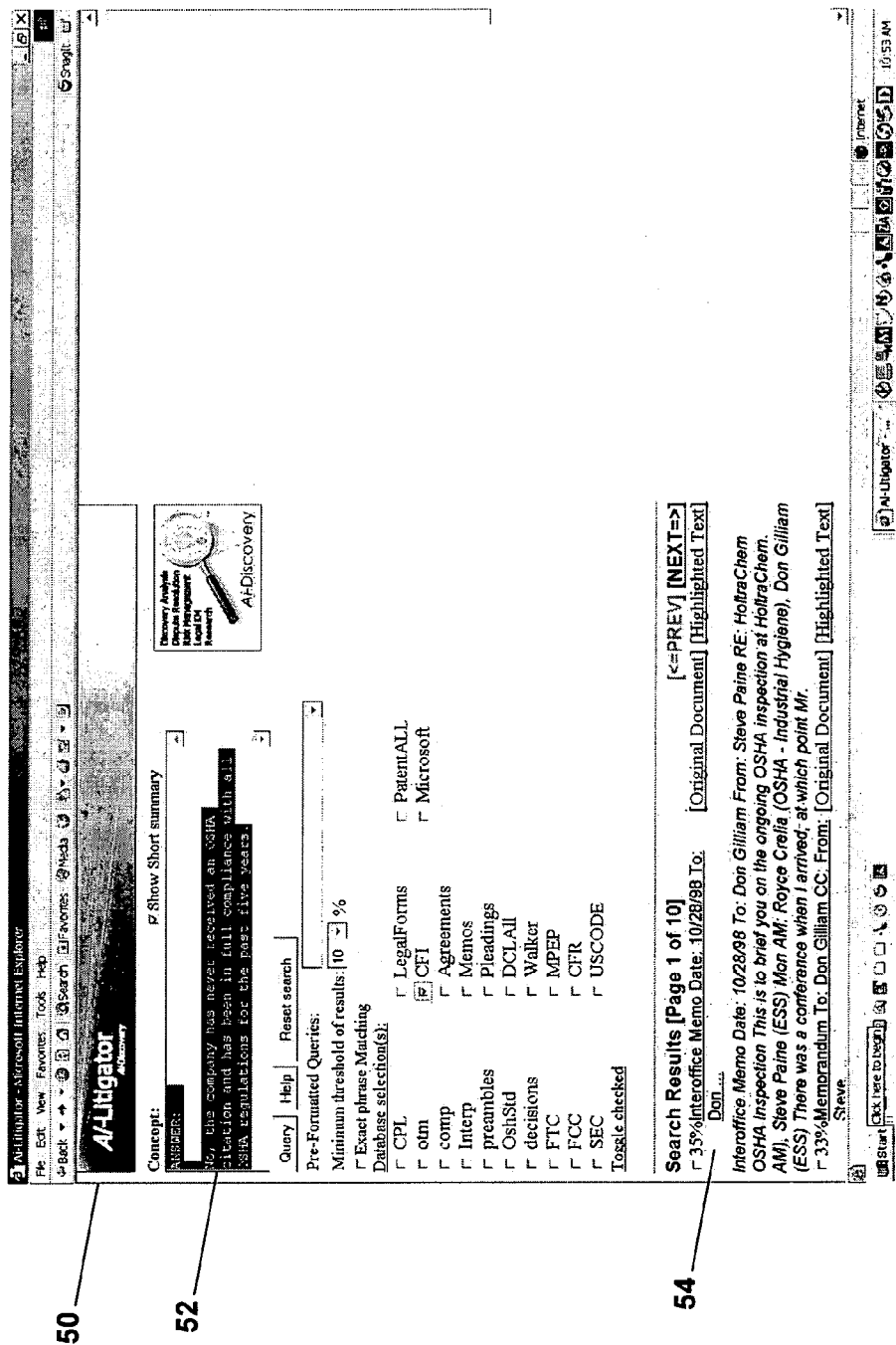
FIG. 5 illustrates a GUI screenshot of the input of an embodiment of the present invention.

The statement analysis module, preferably a voice stress analysis software module, detects that the answer given at lines 25-27 (underlined) of the transcript is likely false. The text of this answer is then flagged and automatically exported into the litigator tool 50 as a query 52, as shown in the screen shot of FIG. 5. In some situations, the query may also include part or all of the question which precipitates the answer, referred to as "context" information, which in this example would be in lines 23 and 24. The user of the present invention can configure the system to flag or ignore context information in a flexible way. The query immediately returns selected documents 54 in a results window that relate to the false statement and contradict the witness.

Figure 6:
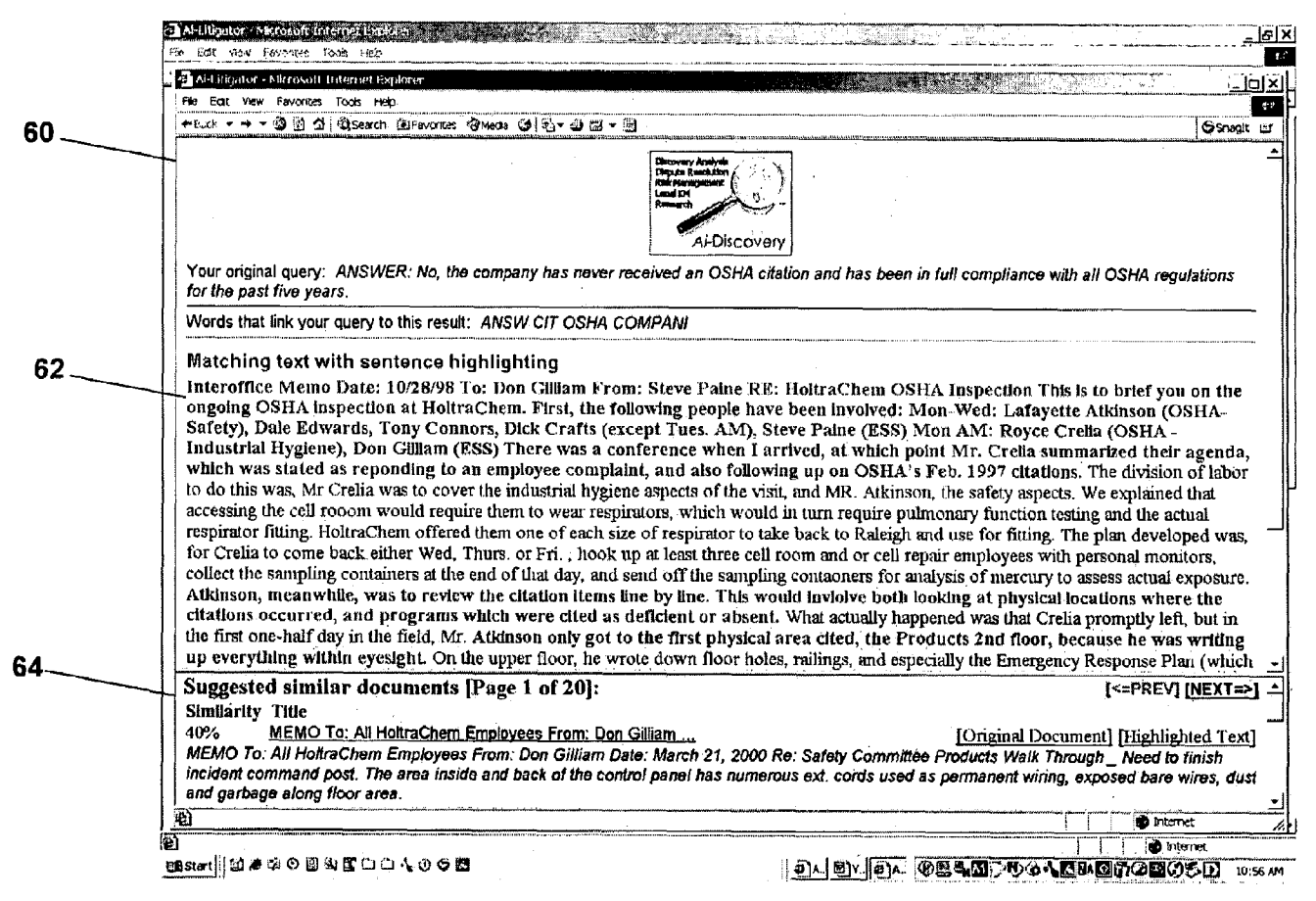

Referring now to FIG. 6, a sample GUI of the present invention illustrating that when the link to a document from 54 is selected, the text 62 of the selected document can be displayed in a separate window 60, preferably having the relevant portions highlighted. Window 60 can also include links 64 to additional related documents. The witness can be questioned on these on the spot, impeached, etc. Counsel now has identified the false statements and the documents that go along with them.

Although described in the above example with reference to a videotaped deposition, the statement analysis software module can also be used for other situations, including but not limited to court testimony, jury selection (to analyze the potential jurors true feelings on an issue), employment interviews, background interviews, regulatory hearings, legislative hearings, financial analysts conference calls, homeland security, law enforcement questioning, etc.

When using voice recognition to produce the transcript from the recorded statement, such as during live statements, matching the portions flagged by the statement analysis software module to the corresponding transcript material can be done automatically. Typically, the recorded statement will be time-stamped and correlated with the transcript text produced by the voice recognition software. Known means, including but not limited to use of SMIL, can be used for this automatic synchronization. Of course, the text, no matter how produced is capable of being correlated to the time-stamped voice recording.

Figure 7:
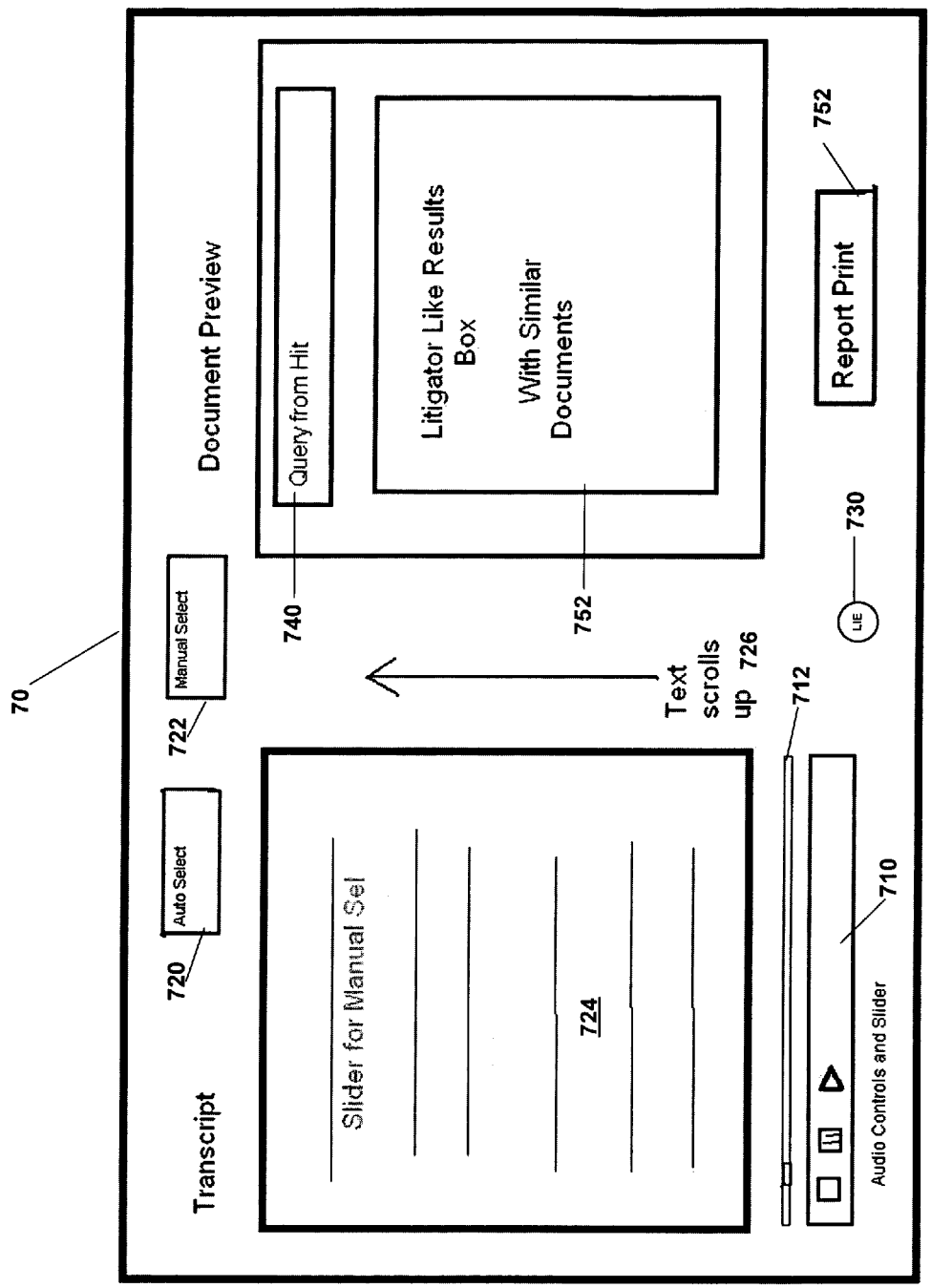
FIG. 7 illustrates a GUI of another embodiment of the present invention.

Additionally, in many cases it will be desirable to manually select the bounds used for the submitted query. As illustrated in FIG. 7, a GUI 70 can be used that allows both automatic selection 720 and manual selection 722 of the transcript material 724 to be used for the query 740. The GUI 70 can include scroll controls 726 for the displayed transcript 728 and further include standard audio controls 710 as well as a slider 712 for recorded audio. The GUI 70 can also include a visual indicator 730 for when the voice analysis software has detected a possible false statement.

Another portion of the GUI 70 can include a document preview window for the results 752 produced by query 740. A print button 754 can be included to print a report of the query results 752.

Figure 8:
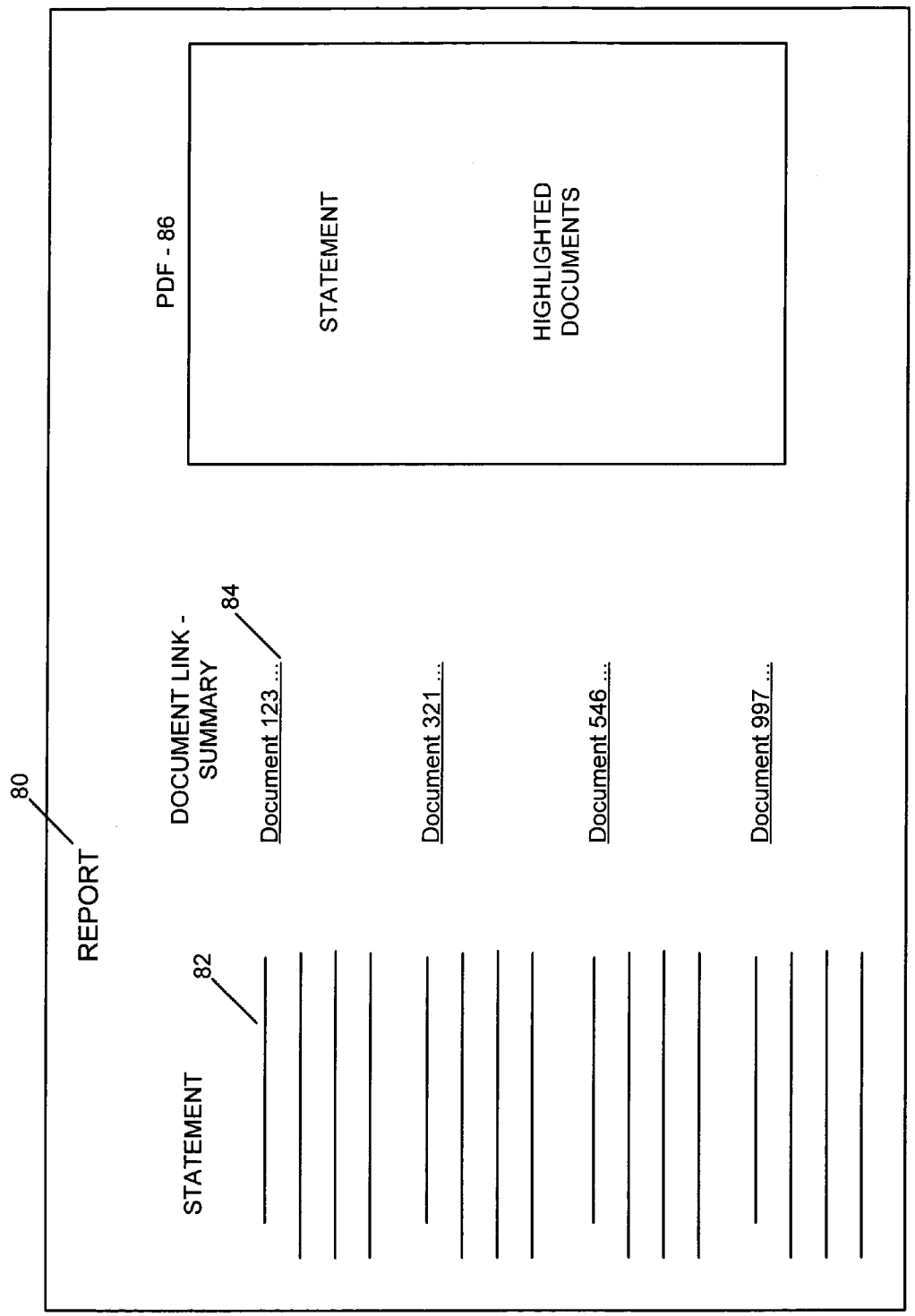
FIG. 8 illustrates a report produced by an embodiment of the present invention.

A sample of a type of report that may be printed or transmitted over the web is illustrated in FIG. 8. The report 80 can include a printout of the potentially false statement 82 and a document link/summary 84 of the search results. The report can also print a PDF 86 of the documents with the witness statement at the top and the highlighted documents underneath.

Figure 9:
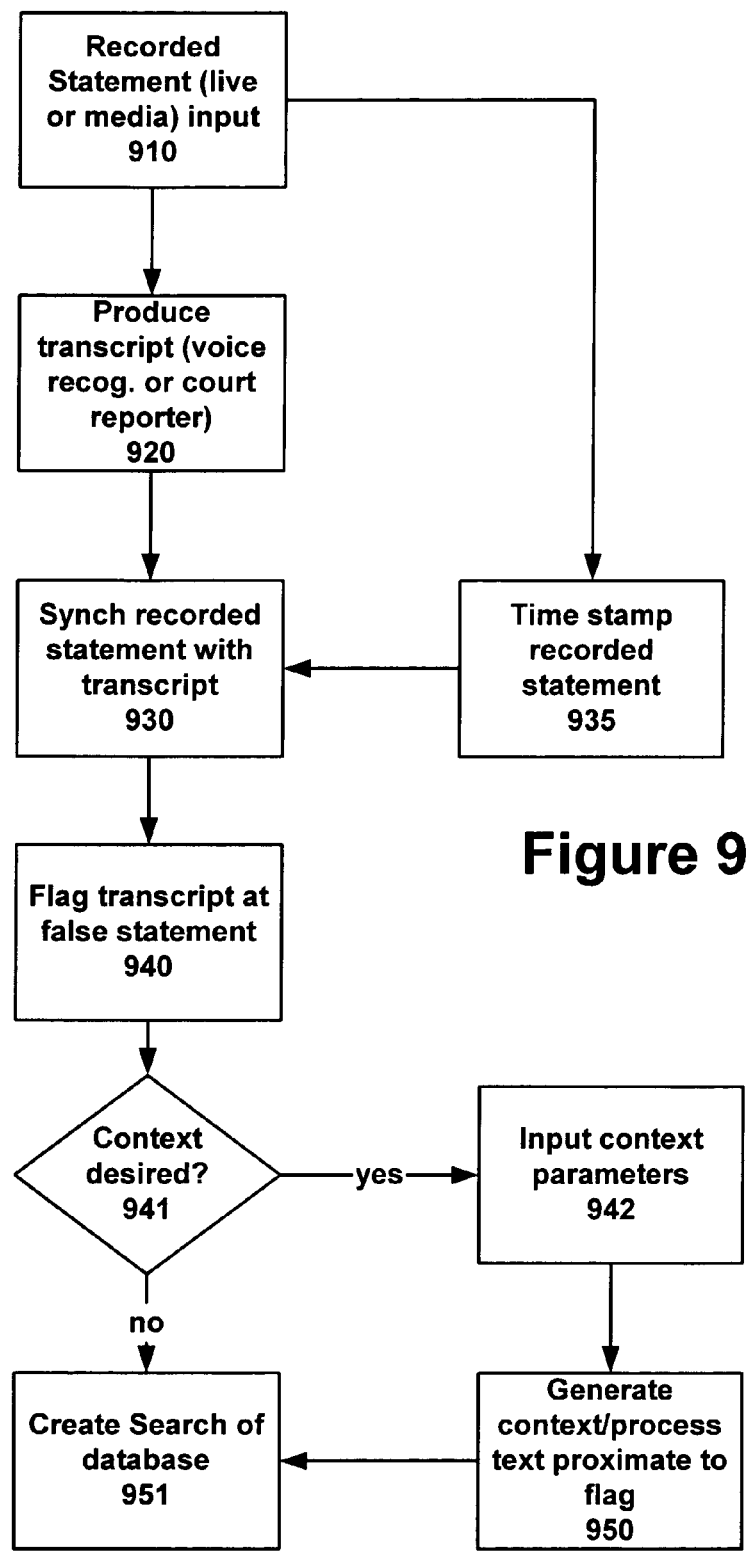
FIG. 9 illustrates one embodiment of a process diagram for handling recorded statements lacking a synchronized transcript.

Referring now to FIG. 9, text and voice processing is illustrated. As noted earlier, a recorded statement from a live or previously recorded session is input to the system 910. A transcript in text form is created from the audio recording 920. This can be created by a stenographer (court reporter) or via voice recognition software currently available in the market such as ScanSoft Dragon NaturallySpeaking, IBM ViaVoice, or similar programs.

The audio record 910 is time stamped 935 so that any section of the audio recording can be referenced in time in either absolute time, relative time, or other reference point. The time stamped audio file is then synchronized with the text file 930.

The audio and text files are then ready for voice stress analysis processing. When the voice stress analysis software determines a section of the audio file indicative of stress in the voice of the subject, that section of the text file is flagged 940. The operator is given the option of designating context portions of the text file 941 so that such portions can be used to designate queries by the system of the present invention. If no context is desired, an appropriate search query is rendered taking into account only the flagged portion of the text file.

If however, context is desired 941, the user can input context information parameters 942. Context information, proximate to the flagged portion of the text file is then generated 950 and both the context information and the flagged portion of the text file is used to create a query from the system.

Figure 10:
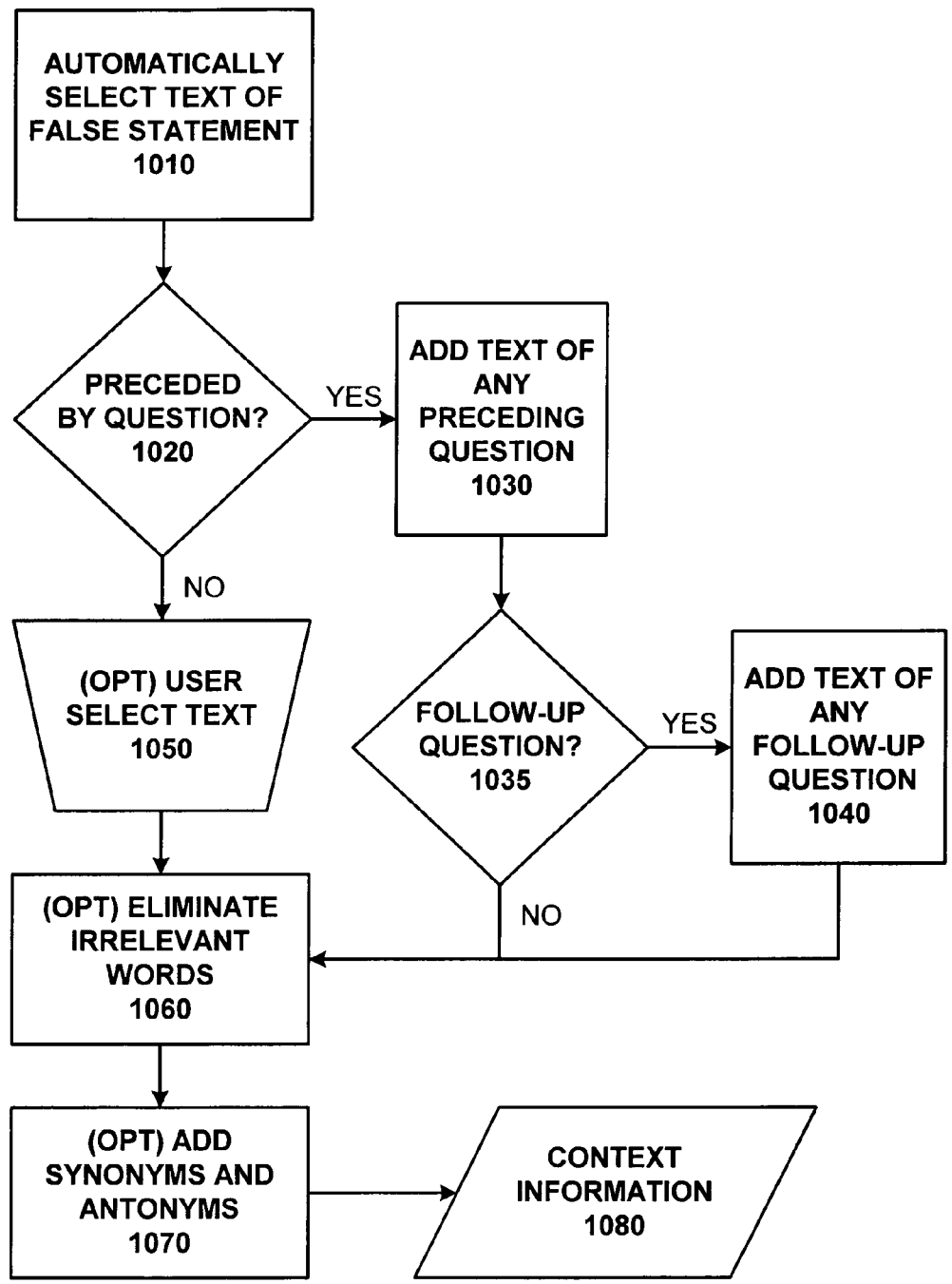
FIG. 10 illustrates one embodiment of a process diagram for producing context information used in the present invention.

One manner of processing the text proximate the flag is illustrated in FIG. 10. In this embodiment, the sentence of the text containing the timestamp of the false statement is automatically selected, 1010. The software will then check to see if the false statement was preceded or precipitated by a question, 1020. For vendor-synchronized recorded statements, embedded information or explicit text labeling the speakers can be used to determine this. For other situations, the voice recognition software can be used to detect different voice patterns and to attribute text to various speakers. In such cases, the text of the immediately preceding speaker can be assumed to be a precipitating question. If a preceding question is found, the text of the question can be added 1030 to the selected text. In a similar manner, the subsequent speaker text can be analyzed, by word matching, concept matching, or any other suitable means, to determine the likelihood of being a follow-up question. If so determined at 1035, the text of the follow-up question can also be added 1040 to the selected text.

As illustrated at 1050, the user may optionally select or input text. Although disclosed at a certain location in the flowchart, this can be done anywhere in the process. When all of the text has been selected or input, an optional step 1060 of eliminating irrelevant words can be implemented. Since many search engines also have some form of this capability, use of this step will often depend on the search engine used. In a similar manner, an optional step 1070 of adding synonyms and antonyms can be implemented. Again, a few search engines also have some form of this capability with respect to synonyms, so use of this step will often depend on the search engine used.

For false statements that depend on the question for context, such as "yes," "no", "I'm not sure," etc., the affirmative or negative being indicated as a lie can sometimes make the searching of antonyms of more importance. Indeed, it will often be desirable to assign weights to the different portions of the selected text, i.e., the false statement, the preceding question, the follow-up question, and the user-selected text, as well as assign weights to specific words and their synonyms/antonyms. For example, when the false statement is a "yes," the statement can have little or no weight, but the question, e.g., "are you licensed?", will have more weight and the antonyms, such as "revoked," "disciplined," and "suspended" can have even higher weights. The final, processed text and any associated weights are used as the context information 1080 that is used as a search query in a search engine or used to produce a search agent for AI-based searching.

Although the present invention can be used with previously recorded statements on a desktop computer, employment of the invention on a laptop or other portable computing device, preferably networked to the relevant databases (whether wired or using Wi-Fi or Wi-Max wireless networking) allows more flexible deployment of the invention, including use on live exchanges.

Although the voice stress analyzer of the present invention is disclosed as a software module, the system can also use other analysis tools, including, but not limited to, a hardware-based voice analyzer with a data link to a computer running search products such as the AI-Litigator® software, a polygraph machine with a data link to a computer running the AI-Litigator software, and a "Truth Wizard"-operated signal switch with a data link to a computer running the AI-Litigator software.

By employing Autonomy's DRE or similar neural network software, the present invention can use smart agents to sift through mountains of heterogeneous electronic information quickly and effectively. The trained smart agents can be used to extract text and other information from almost anything: they can burrow through email systems such as Microsoft Exchange® and Lotus® Notes, word processing files such as Microsoft Word® and Corel® WordPerfect®, electronic spreadsheets, news feeds, web pages, electronic databases, presentations, Adobe® PDF files, etc. Numerous file formats and all ODBC-compliant databases, such as Access®, Oracle®, SQL Server, dBase, DB2, etc., can be searched by the present invention.

Although Autonomy's DRE has been mentioned as a source for helping create smart search agents, its use is not meant as a limitation and other search engine or neural network software can be employed. Additionally, the present invention has been disclosed primarily with respect to data related to legal issues, but one of skill in the art would recognize that the invention can be applied to other valuable issue-related topics, such as corporate and homeland security, corporate research, the legislative and regulatory process and other consulting-type issues.

A system and method for electronic discovery on computer databases and archives using live or recorded statement analysis and a search engine to recover relevant data have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

I claim:

1. A method for providing electronic discovery on computer databases and archives using artificial intelligence to produce smart search agents to locate relevant impeachment data and data related to a potentially false statement comprising:
   inputting information relevant to desired data related to an issue into a neural network;
   training the neural network to produce a search algorithm in the form of a smart search agent, wherein said training comprises a query produced by analyzing recorded statements for potential false statements comprising analyzing an audio portion of the recorded statements using a voice stress algorithm and selecting transcript data corresponding to said potentially false statements as input for the query;
   selecting a target computer database and archives to search for responsive data and documents;
   searching the target computer databases and archives using said smart search agent; and
   outputting results responsive to the searching.

2. The method for providing electronic discovery on computer databases and archives of claim 1, wherein said voice stress analysis is performed by a software module on a computer.

3. The method for providing electronic discovery on computer databases and archives of claim 1, wherein said issue is a legal issue and said relevant data are legally relevant documents.

4. The method for providing electronic discovery on computer databases and archives of claim 3, further comprising indexing the said results for review of possible confidential and/or privileged material.

5. The method for providing electronic discovery on computer databases and archives of claim 4, further comprising locking the results when a user does no have appropriate access privileges and unlocking the results when a user has appropriate access privileges.

6. The method for providing electronic discovery on computer databases and archives of claim 1, further comprising scanning paper documents into the computer database.

7. The method for providing electronic discovery on computer databases and archives of claim 1, further comprising inputting the target database as information relevant to desired data for training the neural network.

8. The method for providing electronic discovery on computer databases and archives of claim 1, wherein the neural network is a legal concept neural network.

9. The method for providing electronic discovery on computer databases and archives of claim 1, wherein the discovery is for a purpose selected from the group consisting of litigation, alternative dispute resolution, security clearance, regulatory compliance, legal risk management, and criminal law enforcement.

10. The method for providing electronic discovery on computer databases and archives of claim 1, wherein the analyzing recorded statements is selected from the group consisting of voice stress analysis, polygraph analysis, and human-detected lies.

11. The method for providing electronic discovery on computer databases and archives of claim 1, wherein the selecting transcript data corresponding to said potentially false statements comprises selecting at least a portion of transcript text of the false statement, any preceding question, and any follow-up question.

12. The method for providing electronic discovery on computer databases and archives of claim 11, further comprising processing the selected transcript text by a process selected from the group consisting of word deletion, word weighting, synonym addition, and antonym addition.

13. A system for providing electronic discovery on computer databases and archives using artificial intelligence to produce smart search agents, comprising:
   means for inputting information relevant to desired data related to an issue into a neural network;
   means for training the neural network to produce a search algorithm in the form of a smart search agent, wherein said means for training further comprises means to input a query produced by a means for analyzing an audio portion of recorded statements for potential false statements with a voice stress analyzer and selecting transcript data corresponding to said potentially false statements;
   means for searching a target computer database and archive using the smart search agent; and
   means for outputting results responsive to said means for searching.

14. The system for providing electronic discovery on computer databases and archives of claim 13, wherein said voice stress analyzer is a computer-based software module.

15. The system for providing electronic discovery on computer databases and archives of claim 13, wherein said issue is a legal issue.

16. The system for providing electronic discovery on computer databases and archives of claim 15, wherein said means for outputting results comprises means for indexing the results in a form capable of review for possible confidential and/or privileged material.

17. The system for providing electronic discovery on computer databases and archives of claim 16, wherein said means for outputting results comprises means to lock a file against users not having appropriate privileges and to unlock file a file for users having appropriate privileges.

18. The system for providing electronic discovery on computer databases and archives of claim 13, further comprising means for manually selecting any part of the transcript and using the selected part as a query for databases.

19. The system for providing electronic discovery on computer databases and archives of claim 13, wherein said means for selecting transcript data corresponding to the potentially false statements comprises means for selecting at least a portion of transcript text comprising the false statement, any preceding question, and any follow-up question.

20. The system for providing electronic discovery on computer databases and archives of claim 19, further comprising means for processing the selected transcript text selected from the group consisting of means for word deletion, means for word weighting, means for synonym addition, and means for antonym addition.

21. A process of using statement analysis and artificial intelligence to find impeachment data related to a recorded statement, comprising:
   inputting appropriate data related to said recorded statement into an artificial intelligence system;
   developing a search algorithm using the artificial intelligence system;
   converting the search algorithm into a smart search agent, wherein the smart search agent comprises a query produced by analyzing an audio portion of the recorded statement with a voice stress analyzer for potential false statements, and selecting transcript data corresponding to said potentially false statements as input for said query; and
   deploying said smart search agent on relevant computer systems to identify electronic material relevant to impeach the recorded statement.

22. The process of using statement analysis and artificial intelligence to find impeachment data related to a recorded statement of claim 21, further comprising indexing identified material for review of possible confidential and/or privileged material.

23. The process of using statement analysis and artificial intelligence to find impeachment data related to a recorded statement of claim 21, wherein said recorded statement is selected from the group consisting of depositions, court testimony, legal hearing testimony, regulatory hearing testimony, legislative processes, interviews and data produced in discovery.

24. The process of using statement analysis and artificial intelligence to find impeachment data related to a recorded statement of claim 21, further comprising locking the identified material when a user does no have appropriate access privileges and unlocking the identified material when a user has appropriate access privileges.

25. The process of using statement analysis and artificial intelligence to find impeachment data related to a recorded statement of claim 21, further comprising selecting any part of a transcript and using the selected part as a query for databases.

26. The process of using statement analysis and artificial intelligence to find impeachment data related to a recorded statement of claim 21, wherein said selecting transcript data corresponding to said potentially false statements comprises selecting at least a portion of transcript text of the false statement, any preceding question, and any follow-up question.

27. The process of using statement analysis and artificial intelligence to find impeachment data related to a recorded statement of claim 26, further comprising processing the selected transcript text by a process selected from the group consisting of word deletion, word weighting, synonym addition, and antonym addition.

28. A system for providing electronic discovery on computer databases and archives using a search engine, comprising:
   means to input a query to a search engine, wherein said search query is produced by a means for analyzing an audio portion of recorded statements with a voice stress analyzer for potential false statements and selecting transcript data corresponding to said potentially false statements;
   means for searching a selected target computer database and archive using the search engine; and
   means for outputting results responsive to the means for searching.

29. The system for providing electronic discovery on computer databases and archives of claim 28, wherein the voice stress analyzer is a computer-based software module.

30. The system for providing electronic discovery on computer databases and archives of claim 28, wherein said search engine comprises means for training a neural network.

31. The system for providing electronic discovery on computer databases and archives of claim 28, wherein the means for outputting results comprises means for indexing the results in a form capable of review for possible confidential and/or privileged material.

32. The method for providing electronic discovery on computer databases and archives of claim 31, wherein the means for indexing comprises means for locking the results when a user does not have appropriate access privileges and unlocking the results when a user has appropriate access privileges.

33. The system for providing electronic discovery on computer databases and archives of claim 28, further comprising means for selecting any part of the transcript and using the selected part as a query for databases.

34. The system for providing electronic discovery on computer databases and archives of claim 28, wherein said means for selecting transcript data corresponding to said potentially false statements comprises means for selecting at least a portion of transcript text of the false statement, any preceding question, and any follow-up question.

35. The system for providing electronic discovery on computer databases and archives of claim 34, further comprising means for processing the selected transcript text selected from the group consisting of means for word deletion, means for word weighting, means for synonym addition, and means for antonym addition.

36. A process of using statement analysis and a search engine to find impeachment data related to an audio portion of a recorded statement, comprising:
   inputting an appropriate query related to said audio portion of said recorded statement into a search engine, wherein said query is produced by analyzing the audio portion of said recorded statement by voice stress analysis for potential false statements and selecting transcript data corresponding to said potentially false statements as input for said query; and
   deploying said search engine on relevant computer systems to identify electronic material relevant to impeach said recorded statement.

37. The process of using statement analysis and a search engine to find impeachment data related to a recorded statement of claim 36, further comprising indexing identified material for review of possible confidential and/or privileged material.

38. The process of using statement analysis and a search engine to find impeachment data related to a recorded statement of claim 36, wherein the recorded statement is selected from the group consisting of depositions, court testimony, legal hearing testimony, regulatory hearing testimony, legislative processes, interviews and data produced in discovery.

39. The process of using statement analysis and a search engine to find impeachment data related to a recorded statement of claim 37, further comprising locking the identified material when a user does not have appropriate access privileges and unlocking the identified material when a user has appropriate access privleges.

40. The process of using statement analysis and a search engine to find impeachment data related to a recorded statement of claim 36, further comprising selecting a part of the transcript and using the selected part as a query for databases.

41. The process of using statement analysis and a search engine to find impeachment data related to a recorded statement of claim 36, wherein the search engine comprises artificial intelligence and the process comprises training of a neural network.

42. The process of using statement analysis and a search engine to find impeachment data related to a recorded statement of claim 36, wherein said selecting transcript data corresponding to said potentially false statements comprises selecting at least a portion of transcript text of the false statement, any preceding question, and any follow-up question.

43. The process of using statement analysis and a search engine to find impeachment data related to a recorded statement of claim 42, further comprising processing the selected transcript text by a process selected from the group consisting of word deletion, word weighting, synonym addition, and antonym addition.

* * * * *